Figure 1:
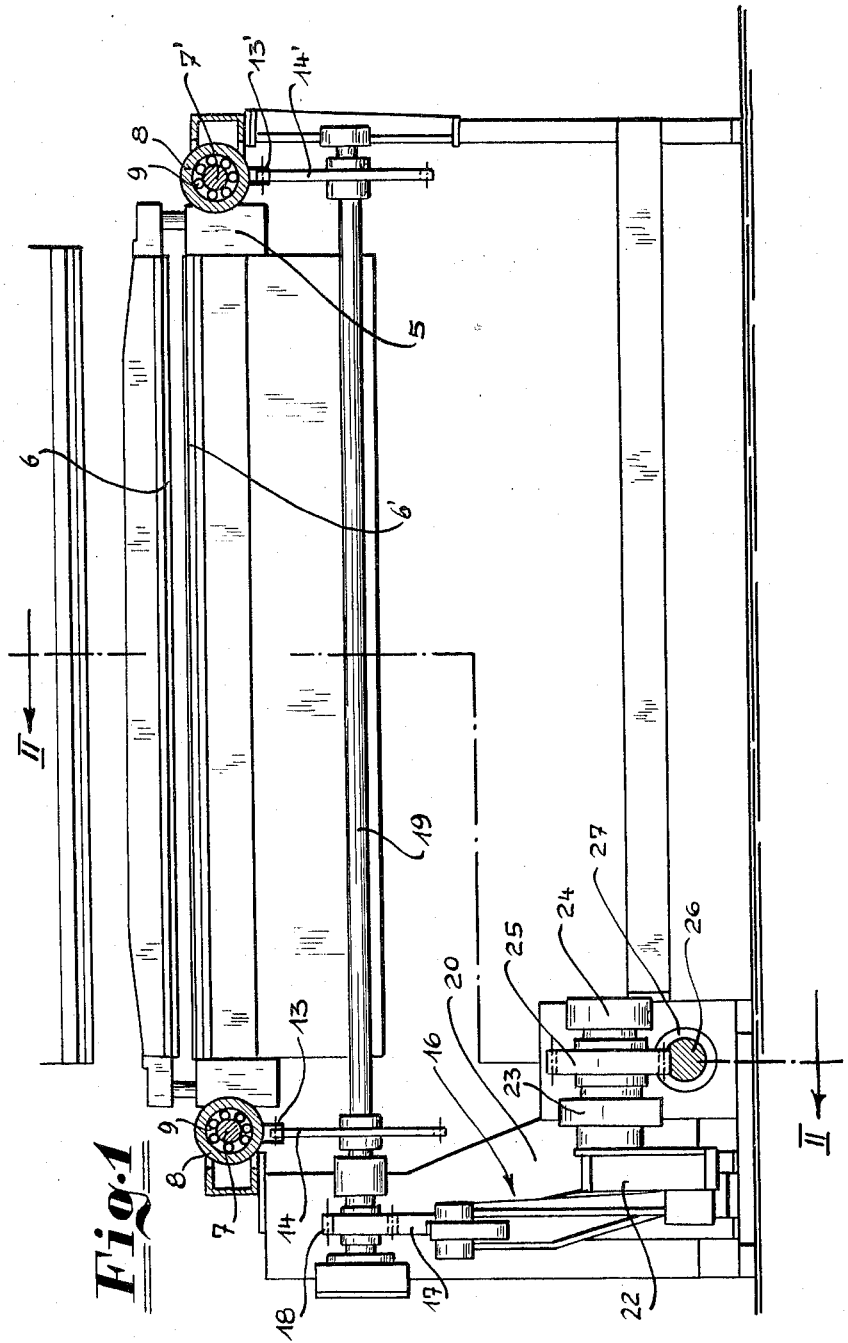

Jan. 31, 1967  W. HARTMANN  3,301,113
PUNCHING PRESS OR OTHER PROCESSING MACHINE
Filed July 20, 1965  4 Sheets-Sheet 1

INVENTOR.
Will Hartmann
BY
Michael J. Striker

Fig. 2

Jan. 31, 1967   W. HARTMANN   3,301,113
PUNCHING PRESS OR OTHER PROCESSING MACHINE
Filed July 20, 1965   4 Sheets-Sheet 3

INVENTOR.
Will Hartmann
BY
Michael J. Striker

Jan. 31, 1967     W. HARTMANN     3,301,113

PUNCHING PRESS OR OTHER PROCESSING MACHINE

Filed July 20, 1965                              4 Sheets-Sheet 4

INVENTOR.
Will Hartmann
BY
Michael J. Striker

United States Patent Office 3,301,113
Patented Jan. 31, 1967

3,301,113
PUNCHING PRESS OR OTHER PROCESSING MACHINE
Willi Hartmann, Lemberg uber Pirmasens, Germany, assignor to J. Sandt Aktiengesellschaft, Pirmasens, Germany
Filed July 20, 1965, Ser. No. 473,406
Claims priority, application Germany, July 21, 1964, S 92,163
7 Claims. (Cl. 83—155)

This invention relates to a punching press or other processing machine, particularly for soft punching material, and to an associated feed gear mechanism.

Heretofore, for processing workpieces of textiles and other soft materials being supplied mostly in form of rolls, scissors have been used. Difficulties encountered in cutting were that the relatively soft and not stiff material took up much time in processing. Therefore, the textiles were stored in high stacks, in order to process more economically, and were being cut by means of tape knife devices.

Since the stack of the layers of textile blanks took up rather long time and the cutting was done by means of a stencil plate being set on to the stack and its contours being copied; the different cuts changing from one stack to the other were not satisfying.

Punching of such work piece stacks is a more economical and precise procedure.

The punching of textiles guarantees that all pieces are of identical size in accordance with the tool and thus a good processing is possible.

By directly pulling off a continuous sheet material from the individual supply rolls to the stack to be punched, the layer of individual sheets can be avoided.

For pulling off, respective pairs of driven rollers being adjustable relative to each other have been used which pulled off the individual sheets from the supply rolls and pushed same into the punching space of the punching machine, or—if the roller pairs were arranged behind the machine—drew the sheets into the space. This feeding device was not suited for feeding the processing machine properly with such soft material like textile sheets, since the rollers only caused a line touching and by this pressing and the absence of a respective guide after leaving of the pair of rollers, the sheets did not uniformly arrive in the punching space.

One object of the invention is to eliminate such disadvantages and for this purpose the invention provides a punching press having a reciprocating punching beam; according to my invention said press is provided with a feeding device, comprising a pair of gripping members, such as clamping jaws and/or feeding tongs, respectively, for stepwise moving of the material to be punched in feed direction.

With the known feeding device for such a press the work pieces to be punched, namely individual sheets or felt pieces, are being seized from their rear ends by feed tongs while they do not rest upon a conveyor belt or a conveying table, and the tongs themselves are the only feed means. Also such a feeding device is not suited for proper guiding, particularly not for wrinkle-free smooth feeding of soft textile work pieces, especially feeding of continuous sheets being pulled off rolls, such as bouclé-type carpet sheets or textile or soft plastic materials as being used, for instance when lining passenger cars.

My invention now makes use of such gripping and feeding members in a new way to solve the aforementioned feed problem by providing at least one continuous conveyor means, particularly a conveyor-belt or a train of conveying rolls for receiving, for feeding and supporting of the sheet material; and the pair of gripping members serving for feeding purposes, e.g. feed tongs, are formed and provided as a driven clamping means for feeding sheet material into or within the processing space and for simultaneously gripping and driving the conveyor-belt together with such fed sheets. Instead of one such single conveyor means or belt, several conveying belts, for instance running parallel and side by side may be provided which are working together with only one pair of feed and gripping members.

With a punching machine with a pressure roll below which a cut-off work piece resting over a punching tool upon a reciprocatingly movable table is being passed, feed tongs fixed on conveyor chains movable adjacent to the punching table and seizing the cut-off work piece at its edge, serve to first draw the cut-off work piece behind the cutting device onto the movable table before the latter will be moved underneath the pressure roll. The machine is expensive and complicated in operation, requires a movable working table with a special drive being independent from the conveying places, and the feed tongs do not effect this operational feed during punching operation.

Contrary to the known feed tongs, which form the actual carrying and/or feeding means for the material, according to my invention the feed tongs in the first line are only a driving means for the support carrying the material to be punched, namely a conveyor-belt known per se and are only in the second instance an additional holding means for such material, which holding means is however freed from the function to support the material to be treated. Therefrom results, not only the possibility to precisely and wrinkle-free feed any desired soft textile material into the working space of the processing machine, e.g. the punching press, in a most simple way, without expenses for machinery and without loss of time, but there arise further possibilities and advantages which are obvious from the following description of a preferred embodiment.

One of these possibilities is to provide the conveyor-belt as a punching belt in a kind known per se. For this purpose it could preferably be made of steel sheet metal, rubber or flexible plastic material, e.g. polyvinylchloride.

In case the conveyor-belt is provided for conveying the material to the punching press and simultaneously as a punching belt its lower strand may not be led back around the punching press on its outside, but is preferably led directly back through the punching space, in order to guarantee quicker assembling and disassembling the feeding device. In the punching space the two strands of the belt may move in opposite directions one above the other. However, an intermediate plate may also be provided which during the feeding movement can be raised either by spring force or positively driven by means of mechanical devices or pneumatically or hydraulically, respectively.

Besides the possibility to feed soft punching material to be punched and stacked in several layers at all to a processing machine, it is most important also during punching that the distances between the fed work pieces are always maintained equal in order to either reduce the waste to a minimum or to prevent any waste at all viewed in longitudinal direction of the sheets since the cut of a previous punching operation, as far as square cuts are concerned simultaneously may form or forms, respectively, the leading edge of the following work piece.

Such a precise feed is, according to my invention, achieved by moving the feed members for example a pair of movable clamping jaws via chains by means of sprocket wheels or belts which in turn are driven by a crank or crank guide mechanism, the crank thereof is to be driven by hydraulic piston, which preferably is formed as a rack. Preferably said hydraulic piston at each end of its stroke abuts against a stop associated with a hydraulic damping device, the feed distance of the crank guide mechanism may be obtained precisely to fractions of a millimeter—contrary to an already known electric drive of such a crank by means of a motor which is stopped in the dead positions of the crank by means of a terminal switch at each end respectively. The lagging inherent in such terminal switches is not always constantly equal, and thus the end positions of the drive crank in the dead positions are not always the same. A feed gear of the type mentioned above may also be advantageously used independent from a punching press according to the invention or similar equipment, e.g. for just one pair of feed rolls or in connection with an endless conveyor-belt or in feeding device in which a train of rolls together with either a pair of rolls or movable feed tongs is used instead of an endless conveyor-belt.

Figure 2:
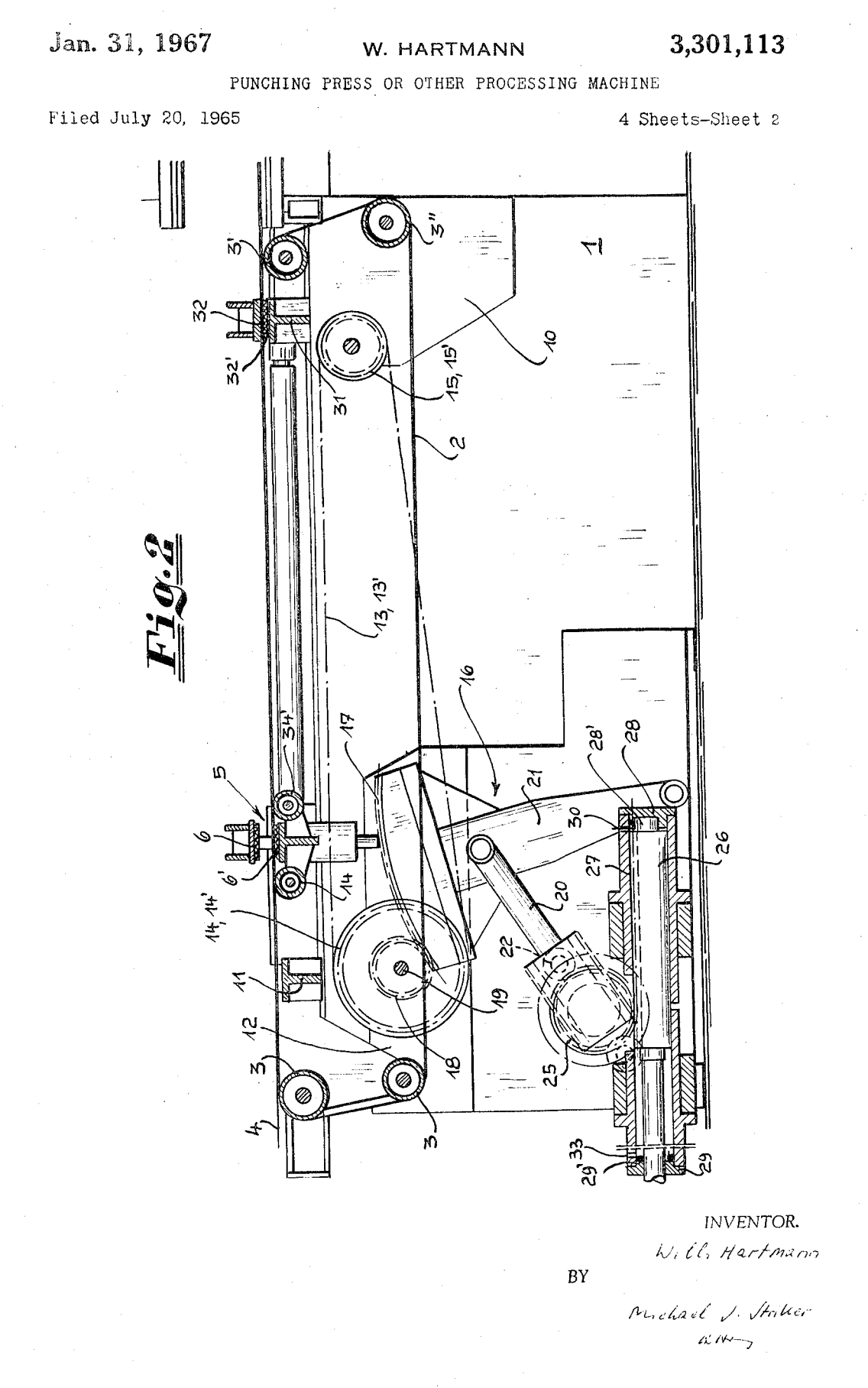
Figure 3:
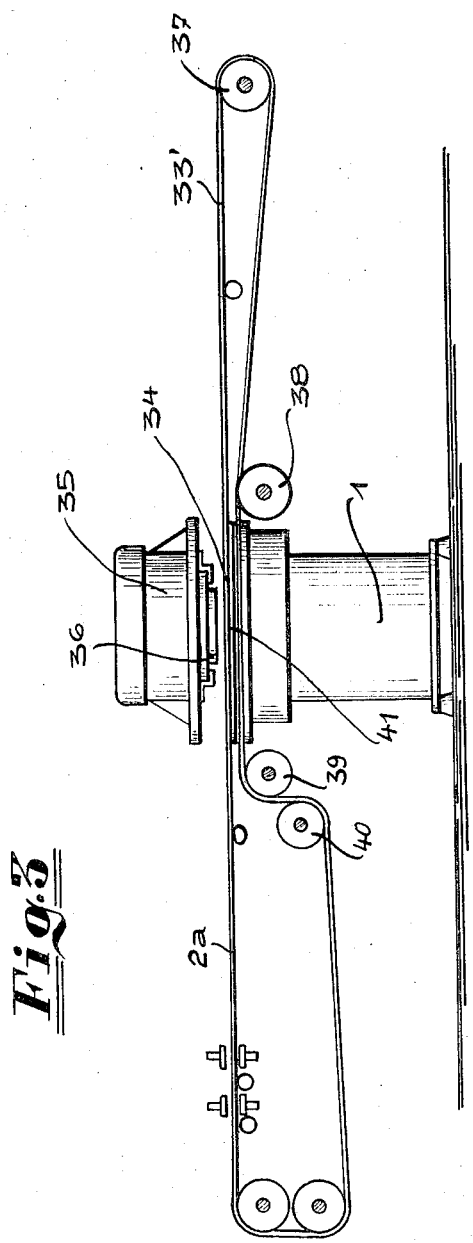
Figure 4:
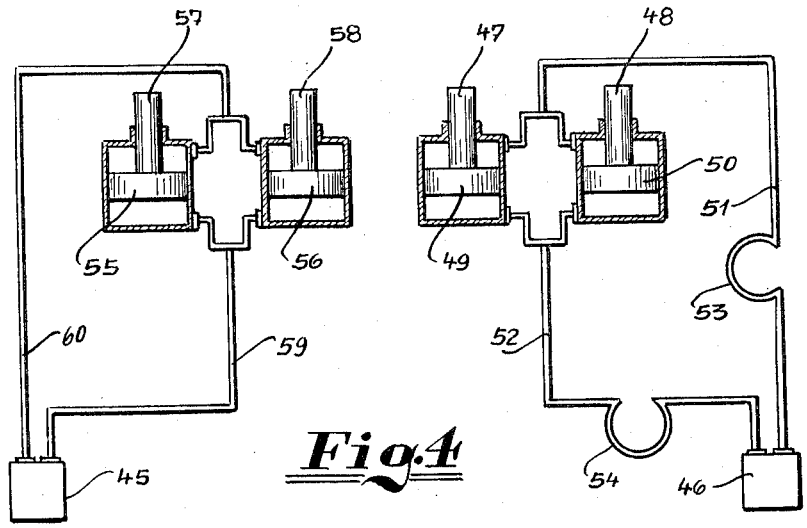
Figure 5:
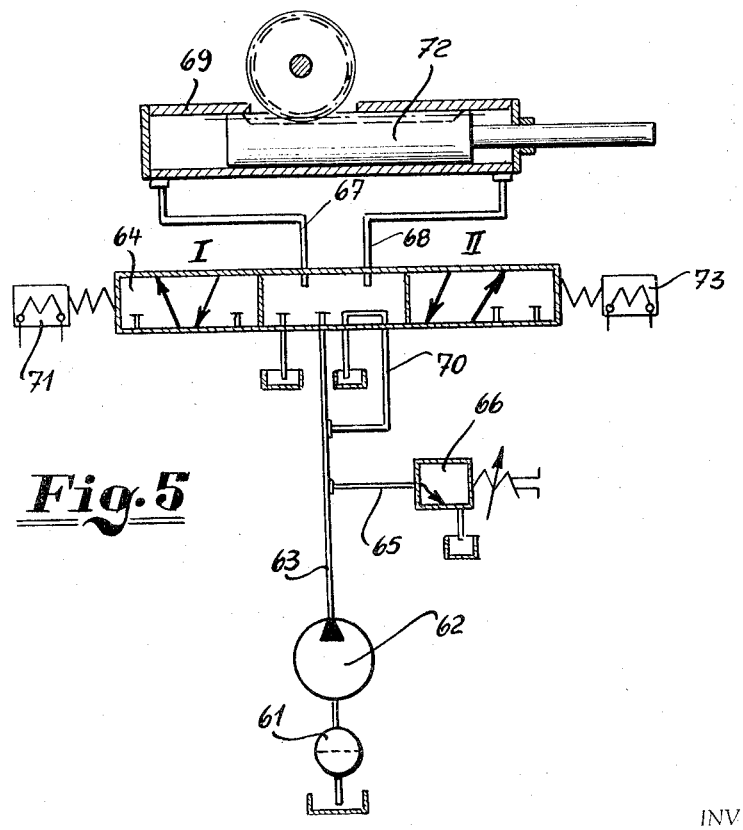

For a better understanding of the present invention and to show how the same may be carried into effect reference will now be made, by way of example for just a single conveyor-belt to the accompanying drawings, in which FIG. 1 is a front elevational view of the feeding device, FIG. 2 is a sectional view according to line II—II of FIG. 1, for an embodiment in which the conveyor-ends belt at the punching press, FIG. 3 is a diagrammatic elevational side view of an embodiment similar to that shown in FIG. 2, the conveyor-belt though being adapted as a punching belt extending all the way through the machine, FIG. 4 is a circuit diagram of the pneumatically operated tongs for an embodiment according to FIGS. 2 or 3, and FIG. 5 is a circuit diagram of the hydraulic piston for the crank mechanism of the embodiment of FIG. 3.

As illustrated in FIG. 2, for feeding the material to be punched towards the punching space, an endless conveyor-belt 2 is arranged adjacent to the punching press 1, the conveyor-belt being guided on rolls 3, 3', 3''. The material 4 to be punched is spread out upon the conveyor-belt after having been pulled off as an endless web of material from a stock roll (not shown in the drawing) by means of a pair of feed tongs 5 having a pair of clamping jaws 6, 6'. The conveying belt 2 is not provided with any drive mechanism, but is moved upon closing of clamping jaws 6, 6' of feed tongs 5.

The pair of feed tongs, with its two cylindrical extensions 8 slides, preferably supported on longitudinal bearings 9, on two cylindrical guide bars 7, 7', which at one end are mounted upon the casing 10 secured to the punching press, and at the other end upon a traverse 11 of the casing 12 of the crank and drive mechanism.

The pair 5 of feed tongs is moved back and forth by means of chains 13, 13' attached to the tongs. Sprocket wheels 14, 14', 15, 15' engage the endless chains and sprocket wheels 15, 15' are for the purpose of changing the direction of travel of chains whereas sprocket wheels 14, 14' are driven wheels for positively driving the chains.

The sprocket wheels are driven by means of a crank mechanism, generally designated 16, having a tooth segment 17 which engages a sprocket wheel 18 being unrotatably connected to rotating shaft 19 on which the two sprocket wheels 14, 14' are arranged. Thus, when driving the crank mechanism 16, its rotating or swinging motion is transferred by its members 17, 18, 19, 14, 14' onto chains 13, 13' carrying the pair 5 of feed tongs. A crank lever 21 of the crank mechanism 16 is pivotally secured to crank 22 by means of a connecting rod 20, the trunnion of which crank lever being supported in bearings 23, 24 and being non-rotatably secured to gear wheel 25 which engages a rack formed on a piston 26 of a hydraulic cylinder 27.

For one complete back and forth motion of piston 26, crank 22 performs a rotation of 180°.

The interior of both cylinder heads 28, 29 is formed as a cuplike damping or cushioning device 28' and 29' respectively, into which piston 26 enters just before reaching its dead position at either end and thus at the the end of each stroke, the motion of piston 26 is smoothly retarded.

Such cup-like damping or cushioning devices provided with valves (not shown) for facilitating the return stroke from either dead position of the position are well known in the art.

It is a novel feature of the present invention that the abutting of the piston at either dead position in accordance with the crank motion results in the fact that with each crank cycle the same terminal positions of the crank and equal displacements of the pair 5 of feed tongs are obtained.

The clamping jaws 6, 6' of the pair 5 of feed tongs are pressed together, preferably, by pneumatic means, for clamping the sheet material 4 onto the conveyor belt. When the clamping jaws are pressed together, piston 26 is moved from right to left (see FIG. 2) by injecting pressure fluid, preferably oil, into an opening 30 of cylinder 27. By means of the various members and parts described above the sprocket wheels 14, 14' are turned clockwise (see FIG. 2) and thus, by means of chains 13, 13' move the pair 5 of feed tongs from its left hand position (shown in FIG. 2) to its right hand position (not shown) adjacent to the punching press.

The feed distance can be adjusted by adjusting the stroke of the adjustable crank mechanism 16 according to the amount of feed, measured in the direction of feed, required for processing the material.

As soon as the pair of feed tongs has reached its right hand position, a pair 31 of holding tongs having two clamping jaws 32, 32' is closed and the material to be processed as well as the conveyor-belt are arrested in this right hand position since the pair 31 of holding tongs is secured to the stationary casing 10.

As soon as the jaws 32, 32' of the holding tongs have been closed, the clamping jaws of the pair 5 of feed tongs are opened. The pair 5 of feed tongs is returned to its left hand starting position (shown in FIG. 2) by injecting pressure fluid into an opening 33 of cylinder 27. As already mentioned, the material to be punched and the conveyor-belt both remain in their position within the punching space because they are kept in position by the pair of holding tongs.

The pair 5 of feed tongs is provided with guide rolls 34, 34' engaging the underside of the conveyor-belt, in order to facilitate returning of the feed tongs.

As soon as piston 26 has returned to its right hand position (see FIG. 2), the machine is ready for beginning another feed cycle.

It is to be noted that the punching stroke of the punching beam of the press is effected during the time interval during which the pair of feed tongs is returned into its starting position (see FIG. 2); the timing of the feeding device and the punching machine secures a continuous operation of the press.

FIGURE 3 diagrammatically represents a punching machine the conveyor-belt of which also serves as a punching belt. A conveyor or punching belt 2a is not running over rollers 3, 3', 3'' as shown in FIGURE 2, but runs through the punching space 34 of punching press 1. The subsequent cuttings are performed intermittently by means of a punching tool 36 mounted on punching beam 35 of the press.

The lower strand of the punching belt is returned through the punching space by means of guide rolls 37, 38, 39, 40 whereby the upper and the lower strand travel in opposite directions within the punching space, one above the other, or wherein a plate 41 may be provided which may be lifted during movement of the punching belt by means of spring force or by mechanic or hydraulic or pneumatic means, respectively. It will be noted that, by returning the punching belt directly through the punching space of the press, it is advantageously possible to remove the material processed by punching as well as the waste to the right hand side of the punching space as shown at 33' according to FIG. 3.

In accordance with the operating cycles of the pair of feed tongs, pneumatic valves 45 and 46 are actuated. Piston rods 47 and 48 are secured to the movable upper clamping jaws 6 of the pair 5 of feed tongs in such a manner that, by actuating pistons 49 and 50 via conduits 51 and 52, the pair 5 of feed tongs is opened and closed respectively. Circles 53 and 54 of FIG. 4 diagrammatically represent the connections of the conduits for the pressure fluid required for the pair of movable feed tongs.

In the same manner as just described, piston rods 57 and 58 of pistons 55 and 56 are secured to clamping jaws 32 and 32' of the pair 31 of holding toings via lines 59, 60.

FIG. 5 shows a hydraulic flow scheme, in which numeral 61 represents a suction filter, numeral 62 a hydraulic pump, numeral 63 a feed line to the magnetically operated 6-way/3-way valve 64 and numeral 65 a branch line to a pressure limiting valve 66 adjustable to any desired pressure.

The 6-way/3-way valve has three operating positions. In the middle position (shown in the drawing) the two feed lines 67 and 68 connected with the hydraulic cylinder are closed.

The pressure fluid delivered by pump 62 via line 70 flows into the oil sump without pressure. By energizing a pushing magnet 71 the left part I of valve 64 is actuated. Thus, the pressurized oil in conduit 63 enters conduit 67 and the left hand side of cylinder 69 thus moving piston 72 to the right (see FIGURE 4). The oil pushed out of the right hand side of cylinder 69 flows back into the oil sump via line 70.

In case pushing magnet 73 is energized, the right hand part II (see FIG. 5) of the 6-way/3-way valve is actuated. As indicated by conduit 67 and thus the left hand end of cylinder 69 is connected with the oil sump whilst the pressurized oil of conduit 63 enters conduit 68, thus moving piston 72 to the left. As long as part I and part II, respectively, of valve 64 are in "on"-position conduit 70 in the multi-way valve 64 is closed so that the pressurized oil may enter either conduit 67 or 68 respectively. The pressure limiting valve 66 is actuated as soon as a predetermined pressure value is reached. As described piston 72 is moved to the right or to the left respectively and thus moves the crank of the crank mechanism.

What is claimed as new and desired to be secured by Letters Patent is:

1. A punch press comprising, in combination, a stationary support means having a first end face; reciprocating punching means having a second end face facing said first end face and being movable toward and away from the latter, said end faces defining between themselves a punching space; an endless conveyor belt having an upper run adapted to receive sheet material to be punched and a lower run; guide means cooperating with said belt for guiding at least said upper run through said punching space with a sheet material thereon facing one of said end faces; feeding means for stepwise moving said conveyor belt in longitudinal direction thereof so as to feed successive portions of sheet material on said upper run into said punching space, said feeding means comprising a pair of gripping members respectively arranged on opposite sides of said upper run and the sheet material thereon and movable relative to each other between an open position and a closed position gripping said upper run and the sheet material thereon, driving means connected to the gripping members for reciprocating the latter in longitudinal direction of said belt through a preselected distance toward and away from said punching space in timed relation with the to and fro movement of said reciprocating punching means, and control means cooperating with said gripping members for moving the same to said closed position before and maintaining the same in said closed position during movement of the gripping members toward said punching space and to said open position before and maintaining the same in said open position during movement of said gripping members away from said punching space.

2. A punching press as set forth in claim 1 wherein said guide means are constructed and arranged to guide also the lower run of said belt through said punching space.

3. A punching press as set forth in claim 2, and including a plate arranged in said punching space between said upper and said lower run.

4. A punching press as set forth in claim 3, and including means cooperating with said plate for lifting the same away from said lower run during movement of said belt.

5. A punching press as set forth in claim 1, and including a pair of clamping paws mounted at a fixed location on said support means and respectively to opposite sides of said upper run and the sheet material thereon, said clamping jaws being movable between an open position and a closed position engaging said upper run and the sheet material thereon for holding the same stationary during movement of said gripping members away from said punching space, and means for moving said clamping jaws between said open and said closed position in timed relationship to the movement of said gripping members.

6. A punching press as set forth in claim 1, wherein said driving means comprise a crank mechanism including a gear wheel and hydraulic cylinder and piston means for driving said crank mechanism, said piston means having a rack portion meshing with said gear wheel.

7. A punching press as set forth in claim 6, wherein said cylinder means has a cylinder head at each end formed as a damping means and cooperating with said piston means for damping movement of the latter at opposite end positions thereof.

References Cited by the Examiner

UNITED STATES PATENTS

| | | | |
|---|---|---|---|
| 1,905,837 | 4/1933 | Flink | 83—276 X |
| 2,235,960 | 3/1941 | Curtis | 83—155 X |
| 2,381,571 | 8/1945 | Buchan | 83—277 X |
| 2,428,493 | 10/1947 | Haller | 83—277 X |
| 3,192,809 | 7/1965 | Grouch et al. | 83—102 X |
| 3,207,019 | 9/1965 | Vanzo et al. | 83—277 |

ANDREW R. JUHASZ, *Primary Examiner.*

WILLIAM W. DYER, JR., *Examiner.*

J. M. MEISTER, *Assistant Examiner.*